(12) United States Patent
Fosbinder

(10) Patent No.: US 7,297,899 B2
(45) Date of Patent: Nov. 20, 2007

(54) OPERATING PARAMETER DEPENDENT VARIABLE OUTPUT WELDING-TYPE APPARATUS

(75) Inventor: Daniel C. Fosbinder, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 413 days.

(21) Appl. No.: 10/709,837

(22) Filed: Jun. 1, 2004

(65) Prior Publication Data

US 2005/0263515 A1    Dec. 1, 2005

(51) Int. Cl.
    *B23K 9/10*    (2006.01)
(52) U.S. Cl. .................... 219/133; 219/130.21
(58) Field of Classification Search .......... 219/133, 219/130.5, 130.21; 290/1 A, 40 C; 322/34
    See application file for complete search history.

(56) References Cited

U.S. PATENT DOCUMENTS

| | | | | |
|---|---|---|---|---|
| 3,034,034 A | * | 5/1962 | Lewis et al. .................... 322/23 |
| 4,465,920 A | * | 8/1984 | Hoyt et al. ................... 219/133 |
| 5,670,070 A | * | 9/1997 | Clark et al. .................. 219/133 |
| 5,825,642 A | | 10/1998 | Ishii et al. |
| 5,861,604 A | * | 1/1999 | McLean et al. .............. 219/133 |
| 5,968,385 A | | 10/1999 | Beeson et al. |
| 6,014,015 A | * | 1/2000 | Thorne et al. ................. 322/34 |
| 6,111,217 A | | 8/2000 | Beeson et al. |
| 6,121,691 A | * | 9/2000 | Renner ........................ 219/133 |
| 6,310,321 B1 | | 10/2001 | Beeson et al. |
| 6,469,401 B2 | | 10/2002 | Beeson et al. |

* cited by examiner

*Primary Examiner*—Clifford C. Shaw
(74) *Attorney, Agent, or Firm*—Ziolkowski Patent Solutions Group, SC

(57) ABSTRACT

The present invention is directed to a welding-type power source controller that includes a processor configured to control a welding-type power source to produce a variable maximum output that can exceed a rated maximum output based on actual operating conditions, as opposed to standardized maximum rated operating conditions.

23 Claims, 3 Drawing Sheets

OPERATING PARAMETER DEPENDENT VARIABLE OUTPUT WELDING-TYPE APPARATUS

BACKGROUND OF INVENTION

The present invention relates generally to welding-type systems and welding-type power sources and, more particularly, to a controller for such systems configured to control a welding-type power source to deliver a variable maximum output according to operating conditions of the welding-type system.

Many welding-type apparatus, for example portable welding-type apparatus, include engine driven generators. In traditional welding generators, the generator is designed to have a rated maximum output that assumes a 100% duty cycle at a given temperature. That is, the engine and generator are designed to operate at the maximum duty cycle at some maximum temperature. As a result, under some operating conditions, the output of the generator may be limited by a maximum operating rating when, in fact, it may not be operating at the maximum duty cycle or the maximum temperature. That is, due to the relationship between operational temperature constraints and high duty cycles, the engine and generator combination is rated at an output that, under nearly all operational conditions, is a worse case scenario and therefore needlessly links output when not operating at those extremes.

Accordingly, the welding-type apparatus incorporating the engine and generator is designed to operate according to the limitations of the engine and generator assuming a 100% duty cycle. Similarly, the welding-type apparatus incorporating the engine and generator is restricted such that under all operational conditions, the engine or generator is not caused to operate above the maximum temperature constraint. Specifically, a maximum rated output is selected such that under a 100% duty cycle in the most stringent operational temperatures, the maximum temperature constraint, or other maximum operational thresholds, is not surpassed.

However, by qualifying such a unit at a maximum rated output of a 100% duty cycle and a stringent operating temperature, the engine and generator, and thereby the welding-type apparatus, are limited from operating above the maximum rated output even when the duty cycle and/or operating temperature are lower than the maximum ratings. That is, under some operating conditions, such as when the duty cycle is less than 100% or the temperature is below the maximum, the engine and generator may be capable of operating above the rated output, but is needlessly restricted.

For example, a given generator may have rated maximum output of 280 Amperes (A) at a 100% duty cycle and at 50 degrees Celsius (C). However, under a lower duty cycle or a lower operational temperature, for example a 50% duty cycle at 30 degrees C., the given generator may be capable of sustaining an output of 325 A. Therefore, while the generator may have a rated maximum output and be configured to operate below that maximum rated output, under some conditions the engine driven generator may actually be capable of an output significantly in excess of the maximum rated output to which it is limited. Accordingly, while under some conditions the engine driven generator may be capable of delivering an output above the maximum rated output, the engine and generator are limited from doing so by the maximum rated output.

It would therefore be desirable to design a welding-type power source incorporating an engine and generator that may be controlled to operate above a maximum rated output dependant as actual operational conditions permit.

BRIEF DESCRIPTION OF INVENTION

The present invention is directed to a welding-type apparatus that overcomes the aforementioned drawbacks. Specifically, the present invention includes a controller configured to operate a welding-type power source in excess of a rated maximum output. That is, the present invention includes a controller configured to control a welding-type power source to have a variable maximum output determined from actual operating conditions of the welding-type power source.

Therefore, the present invention includes a welding-type power source controller is disclosed that includes a processor configured to control a welding-type power source to produce a variable maximum output that can exceed a rated maximum output.

In accordance with another aspect of the present invention, a method of operating a welding-type power source is disclosed that includes determining at least one operating condition of a welding-type power source and comparing the at least one operating condition to a desired operating range. The method includes delivering an output of the welding-type power source above a rated output if the at least one operating condition is within the desired operating range.

According to another aspect of the present invention, a welding-type power source is disclosed that includes an engine, a generator configured to be driven by the engine, and a controller configured to monitor operating conditions of the welding-type power source. The controller is configured to control the engine and the generator to deliver an output above a rated output if at least one of the operating conditions is under a rated maximum parameter threshold.

In accordance with yet another aspect of the present invention, a welding-type apparatus is disclosed that includes means for generating operational power and means for controlling the means for generating operational power according to operating conditions of the welding-type apparatus. The controlling means is also configured to control the means for generating operational power to deliver operational power above a rated maximum power if the operating conditions of the welding-type apparatus are below a threshold.

In accordance with another aspect of the present invention, a welding-type power source controller is disclosed including a processor configured to receive operating condition parameter signals and control a welding-type power source to deliver an output that can exceed a maximum rated output of the welding-type power source based on operating condition parameter signals.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to a welding-type apparatus and, more specifically, to a welding-type power source that includes an engine driven generator and controller configured to control the welding-type power source to operate according to a variable maximum output.

As one skilled in the art will fully appreciate, the hereinafter description of welding devices not only includes welders but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with systems such as cutting and induction heating systems.

Figure 1:
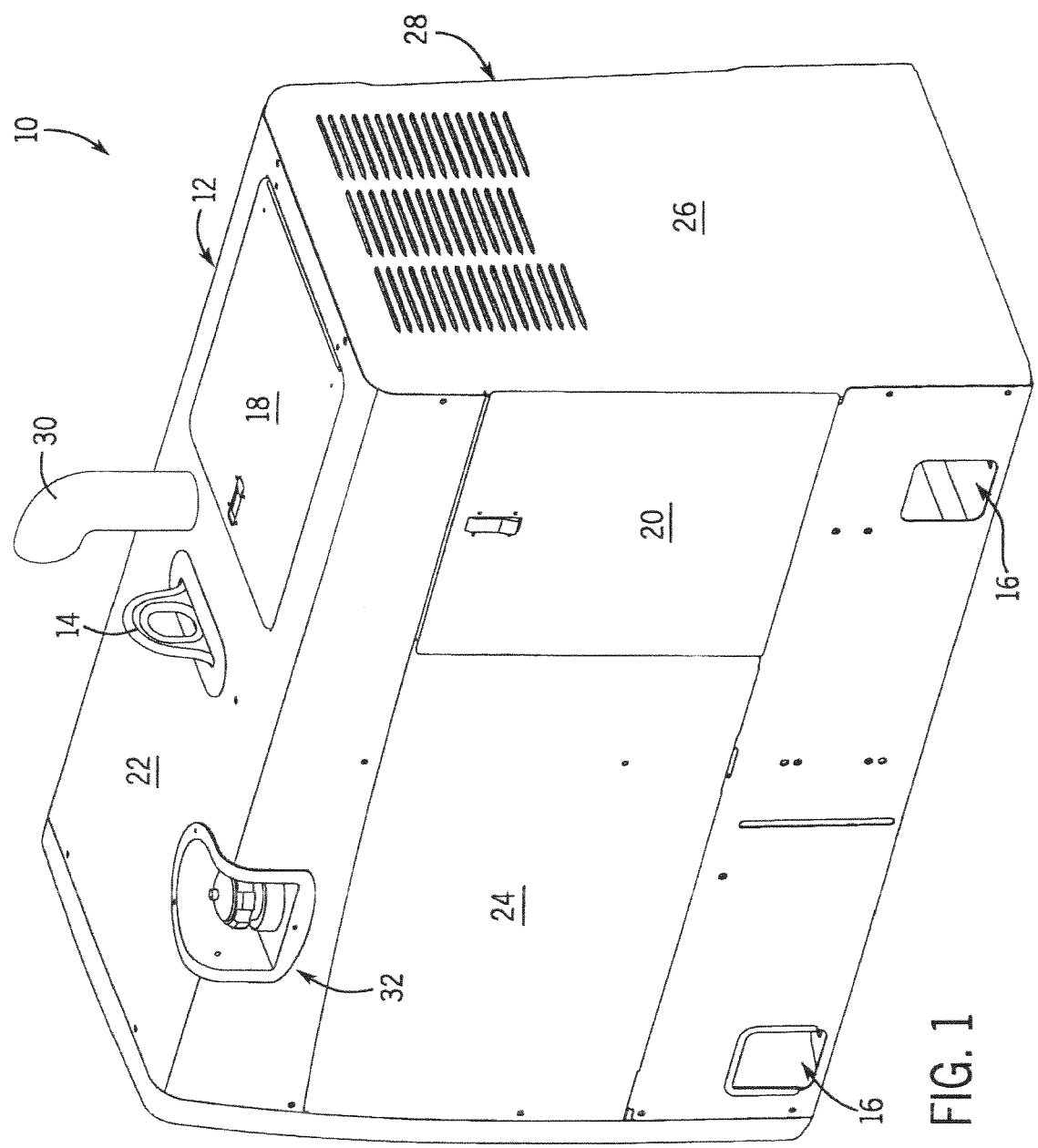
FIG. 1 is a perspective view of a welding-type apparatus incorporating the present invention.

FIG. 1 shows a welding-type device 10. The welding-type device 10 includes a housing 12 which encloses the internal components of the welding device. Optionally, the welding-type device 10 includes a loading eyehook 14 and/or fork recesses 16. The loading eyehook 14 and the fork recesses 16 facilitate the portability of the welding-type device 10. Optionally, the welding-type device 10 could include a handle and/or wheels as a means of device mobility. The housing 12 also includes a plurality of access panels 18, 20. Access panel 18 provides access to a top panel 22 of housing 12 while access panel 20 provides access to a side panel 24 of housing 12. A similar access panel is available on an opposite side. These access panels 18, 20, provide access to the internal components of the welding-type device 10. An end panel 26 includes a louvered opening 28 to allow for air flow through the housing 12.

The housing 12 of the welding-type device 10 houses an internal combustion engine. The engine is evidenced by an exhaust port 30 and a fuel port 32 that protrude through the housing 12. The exhaust port 30 extends above the top panel 22 of the housing 12 and directs exhaust emissions away from the welding-type device 10. The fuel port 32 preferably does not extend beyond the top panel 22 or side panel 24. Such a construction protects the fuel port 32 from damage during transportation and operation of the welding-type device 10.

Figure 2:
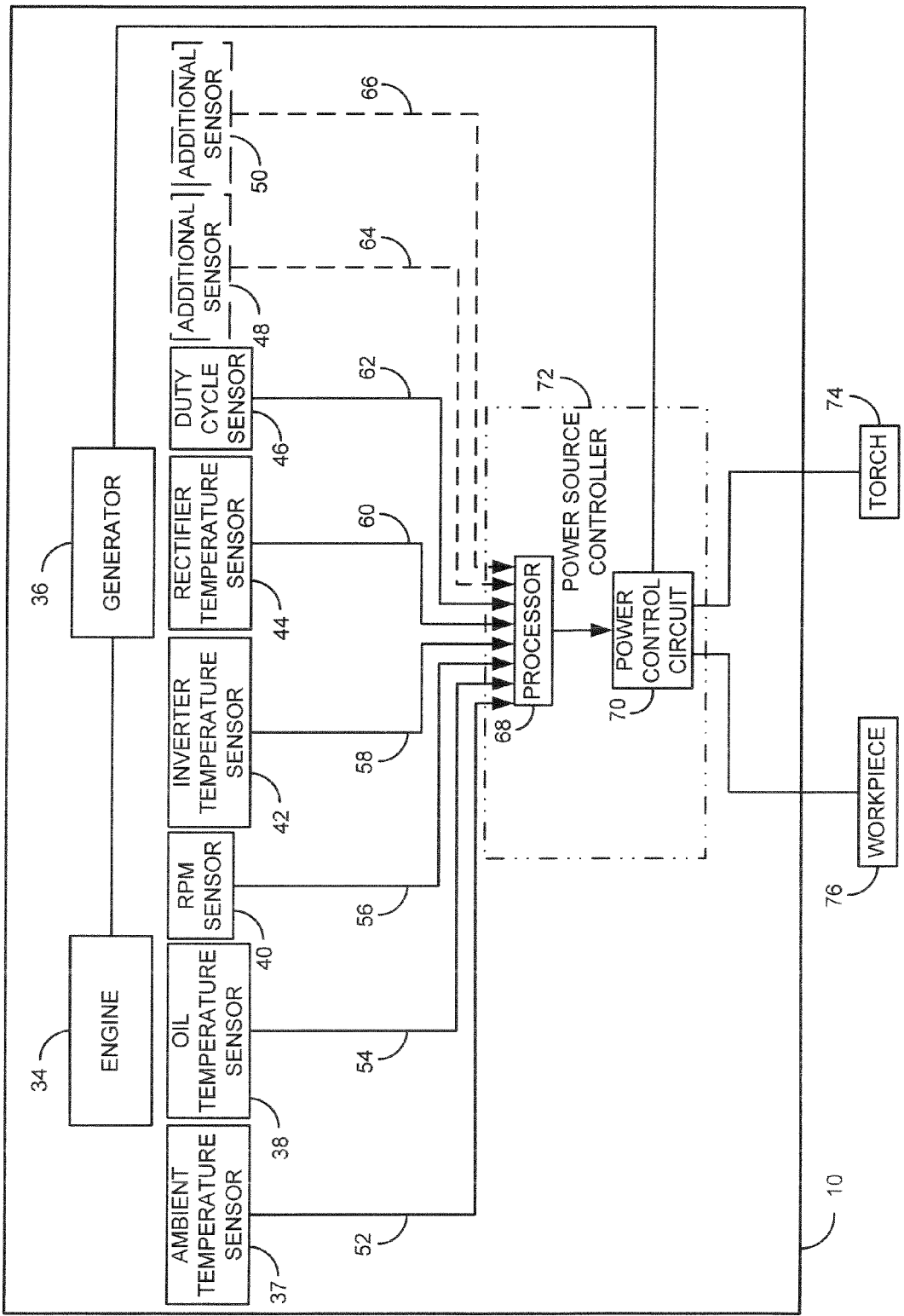
FIG. 2 is a block diagram illustrating some of the components of the welding-type apparatus shown in FIG. 1 in accordance with one embodiment of the invention.

Referring to FIG. 2, a block diagram of some of the components of the welding-type device 10 is shown. Specifically, the welding-type device 10 includes an engine 34 configured to drive a generator 36. A first set of sensors, including an ambient temperature sensor 37, an oil temperature sensor 38, and a revolution per minute (RPM) sensor 40, for example, is included to monitor a variety of operating conditions of the engine 34. A second set of sensor, including an inverter temperature sensor 42, a rectifier temperature sensor 44, and a duty cycle sensor 46, for example, is included to monitor the operating conditions of a variety of operating conditions of the generator 36. The welding-type device may monitor a wide variety of conditions and can therefore include additional sensors 48 and additional sensors 50, which may be configured to monitor the engine 34 and generator 36 respectively. The sensors 37-50 are connected via feedback cables 52-66 to a processor 68, which, as will be described with reference to FIG. 3, interprets the feedback from the sensors 37-50 and controls the operation of a power control circuit 70. The processor 68 and the power control circuit 70 together create a power source controller 72, which as will be described in detail with respect to FIG. 3, controls the welding-type device 10 to deliver a variable maximum output, dependent upon operating conditions, that can exceed a rated maximum output.

The power source controller 72 is configured to control the operation of the engine 34 and the generator 36 and condition the power delivered to a torch 72 to effectuate a welding-type process upon a workpiece 74. Specifically, as will be described with respect to FIG. 3, the power source controller 72 receives feedback from the sensors 37-50, whereby the processor 68 processes the feedback and controls the power control circuit 70 to control the operation of the engine 34 and generator 36 to deliver a variable maximum output that may exceed a rated maximum output.

Figure 3:
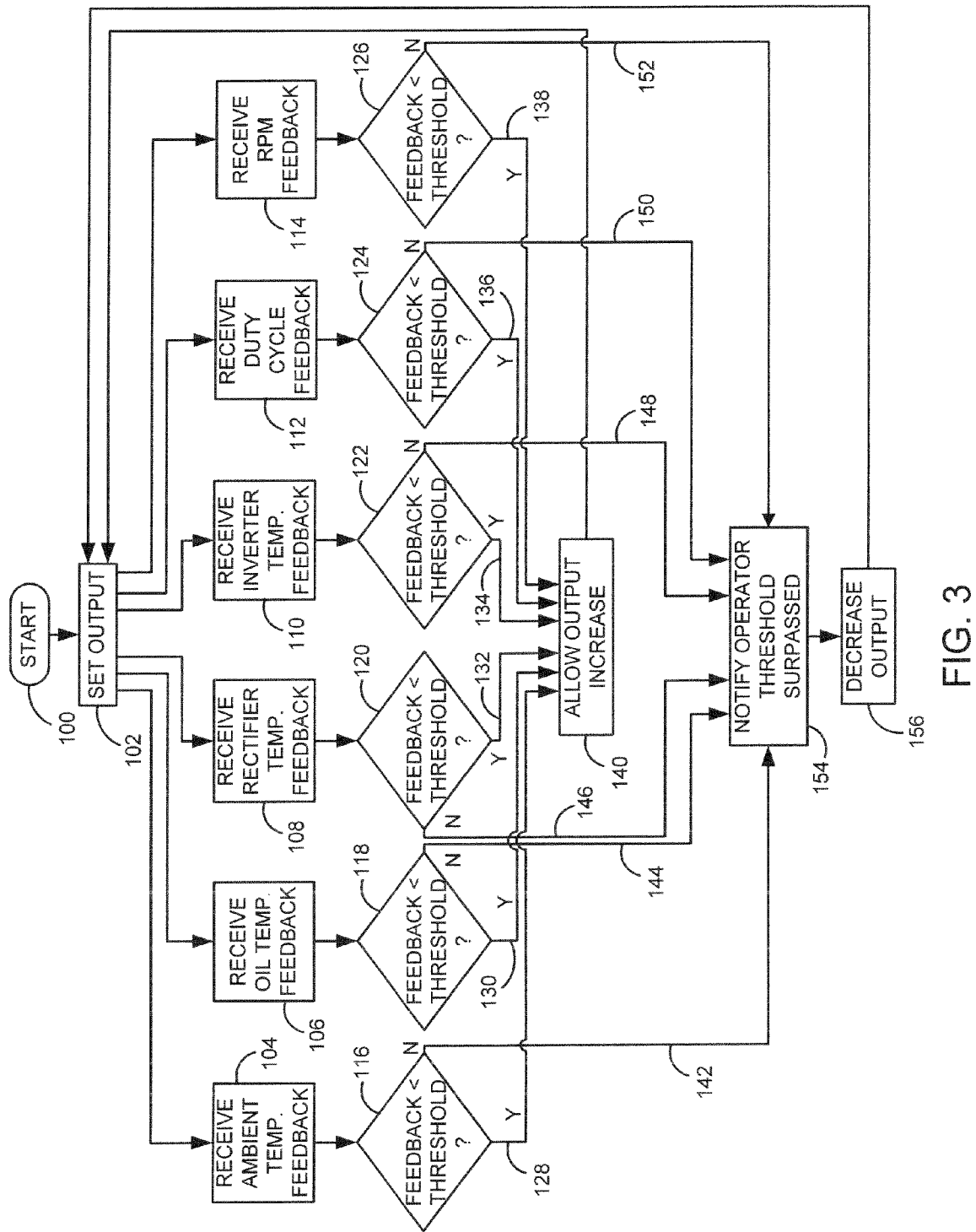
FIG. 3 is a flow chart illustrating a control technique in accordance with one embodiment of the invention.

Referring to FIG. 3, a flow chart setting forth the steps of a technique implemented by way of the power source controller 72, FIG. 2, for controlling the output of a welding-type power source is shown. Upon starting or powering up the power source 100, the power source controller sets an initial output 102 based on default maximum rated output parameters and operator input. Once the output is set 102, feedback begins being generated by the aforementioned plurality of sensors disposed within the welding-type power source such that ambient temperature feedback 104, oil temperature feedback 106, rectifier temperature feedback 108, inverter temperature feedback 110, duty cycle feedback 112, and RPM feedback, for example, are received 114. Again, feedback 104-114 is for exemplary purposes only and additional and varied feedback regarding the welding-type power source is contemplated and within the scope of the present invention.

Upon receipt of the feedback 104-114, each feedback type is compared to a respective threshold 116-126. Should the feedback be less than the threshold 128-138, the power source controller determines that the welding-type power source is operating within a desired operating range, and therefore, an output increase is permissible should the desired operator output benefit from additional power output 140. That is, if the feedback 104-114 is less than the thresholds 128-138, then the operating conditions of the power source are such that additional power output may be achievable from the engine and generator even though the engine and generator may be operating at a rated maximum output. Specifically, upon interpreting the feedback 104-114 with respect to the thresholds 116-126, if the feedback is less than the thresholds 128-138, the operating conditions of the engine and generator are such that a variable maximum output may be set above the traditional or rated maximum output. Therefore, the output of the welding-type power source is allowed to be increased 140 regardless of the rated maximum output.

It should be recognize that the permissibility of increased output 140 may not be dependent upon a determination that all feedback 104-114 is less than a respective threshold 128-138. That is, it is contemplated that a determination of the permissibility of an output increase may be determined based on finding that a predefined percentage or number of feedback 104-114 is less that a respective threshold 128-138. Furthermore, it is contemplated that feedback sources may be hierarchically ranked such that determining that a high ranking feedback is below a respective threshold may lead to a determination that an output increase is allowable 140 even though other, lower-ranking, feedback may be above a respective threshold. Therefore, it is recognized that the processing of the feedback 104-114 and whether the feedback is below a threshold 116-126 may be utilized in a wide variety of ways and through a wide variety of schemes in order to determine whether, under the current operating conditions, the engine and generator may be driven to produce an increased output.

On the other hand, should the feedback 104-114, or a combination of feedback, be above a respective feedback threshold 142-152, the engine and generator are operating at maximum output for the current operating conditions and the operator is notified 154. Simultaneously, or substantially simultaneously, with the notification of the operator 154, engine and generator operation are decreased or shut off 156. Specifically, if the feedback 104-114 indicates that the power source is operating within operating conditions where the engine and generator are at a maximum output, the operation of the engine and generator is decreased or shut off, thereby decreasing or ceasing the output 156. That is, in accordance with one embodiment, the engine and generator output is decreased such that the power delivered to the weld is decreased. However, in accordance with another embodiment, the engine and generator are shut off so that the weld quality is unaffected and potential re-work is avoided.

Again, it is contemplated that the feedback 104-114 may be reviewed independently or in combination. That is, determination that the feedback is not below the thresholds 128-138 may be collectively determined, hierarchically ranked, or independently reviewed. For example, a determination that the duty cycle feedback 112 or the oil temperature feedback 106 is not below the respective thresholds 136, 130, may cause the power source control to determine that the power source is operating at a maximum under the present operating conditions regardless of whether the remaining feedback 104, 108, 110, 114 is below the thresholds 116, 120, 122, 126.

In accordance with one embodiment of the invention, the output is incrementally decreased 156 upon each reiteration of determining that the feedback is not less than the threshold. In accordance with another embodiment, the output decrease 156 is reduced below the rated maximum output of the welding-type power source. Furthermore, it is contemplated that the power source controller may include a map including a plurality of threshold results and corresponding outputs. That is, for a given combination of feedback 104-114 of which some feedback may be below a respective threshold and some may be above a respective threshold, the power source controller may utilize a map to determine whether an output increase is permissible 140 or whether a decrease is dictated 156. Additionally, it is contemplated that the thresholds 116-126 may include ranges that correspond to desired operating ranges dictated by operator input and the particular welding-type operation being performed.

In either case, whether an increase in output is permissible under the current operating conditions or whether a decrease is necessary, once an output is set 102, feedback is again derived 104-114 and compared to a respective threshold 116-126 to determine whether an augmentation of power source operation is necessary or desired.

Therefore, the above-described system enables a welding-type power source to implement a variable maximum output that is tailored to the current operating conditions of the welding-type power source. Accordingly, the maximum power output of the welding-type power source is determined independent of the rated maximum output or rated maximum parameter threshold and, as such, may exceed a rated maximum output should operational conditions permit.

It is contemplated that the present invention may be utilized with a plurality of welding-type process. For example, the welding-type apparatus may operate according to a Gas Metal Arc Welding-type (GMAW) welding-type process, formerly known as Metal Inert Gas (MIG) process, a Tungsten Inert Gas (TIG) welding-type process, a Shielded Metal Arc Welding-type (SMAW) process, an induction heating process, a plasma-cutting process or other welding-type processes.

For example, a given welding-type device having a rated maximum output of 280 A based upon a 100% duty cycle and at 50° C. is controlled to have an output above the rated 280 A. That is, the welding-type device is controlled to have a 325 A output at a 50% duty cycle at 30° C. Therefore, while the welding-type device has a rated maximum output, under certain operating parameters, the welding-type device is controlled to provide an output significantly in excess of the maximum rated output.

Therefore, in accordance with one embodiment of the present invention, a welding-type power source controller includes a processor configured to control a welding-type power source according to a variable maximum output that can exceed a rated maximum output.

According to another embodiment of the present invention, a method of operating a welding-type power source includes determining at least one operating condition of a welding-type power source and comparing the at least one operating condition to a desired operating range. The method includes delivering an output of the welding-type power source above a rated output if the at least one operating condition is within the desired operating range.

According to yet a further embodiment of the present invention, a welding-type power source includes an engine, a generator configured to be driven by the engine, and a controller configured to monitor operating conditions of the welding-type power source. The controller is configured to control the engine and the generator to deliver an output above a rated output if the operating conditions under a rated maximum parameter threshold.

According to another embodiment of the present invention, a welding-type apparatus includes means for generating operational power and means for controlling the means for generating operational power according to operating conditions of the welding-type apparatus. The means for controlling is also configured to control the means for generating operational power to deliver operational power above a rated maximum power if the operating conditions of the welding-type apparatus are below a threshold.

According to a further embodiment of the present invention, a welding-type power source controller includes a processor configured to receive operating condition parameter signals and control a welding-type power source to deliver an output that can exceed a maximum rated output of the welding-type power source.

The present invention has been described in terms of the preferred embodiment, and it is recognized that equivalents, alternatives, and modifications, aside from those expressly stated, are possible and within the scope of the appending claims.

What is claimed is:

1. A welding-type power source controller comprising:
a processor configured to control a welding-type power source to produce a variable maximum output that can exceed a rated maximum output;
an input configured to receive feedback indicative of operating conditions of a welding-type power source; and
wherein the controller is configured to control the welding-type power source to deliver an output above the maximum rated output only if the feedback is below a threshold.

2. The controller of claim 1 wherein the processor is programmed to produce a variable maximum output that exceeds the rated output based on actual operating parameters.

3. The controller of claim 1 wherein the processor is configured to control the welding-type power source to deliver an output equal to or below a maximum rated output of the welding-type power source if at least one of a duty cycle of the welding-type power source is greater than a threshold and a temperature of the welding-type power source is greater than a threshold.

4. The controller of claim 1 wherein the maximum rated output includes at least one of a maximum rated output current and a maximum rated output voltage.

5. The controller of claim 1 wherein the feedback includes at least one of welding-type power source temperature feedback, engine oil temperature feedback, output rectifier temperature feedback, inverter temperature feedback, ambient temperature feedback, duty cycle feedback, and engine RPM feedback.

6. The controller of claim 5 wherein the processor is configured to hierarchically rank the feedback to determine the current operating conditions of the welding-type power source.

7. The controller of claim 1 wherein the threshold includes at least one of a welding-type power source temperature threshold, an engine oil temperature threshold, an output rectifier temperature threshold, an inverter temperature threshold, an ambient temperature threshold, and an engine RPM threshold.

8. The controller of claim 1 wherein the processor is further configured to control the welding-type power source to operate to deliver a reduced output if the feedback is not below the threshold.

9. The controller of claim 1 wherein the processor is further configured to control the welding-type power source to operate to deliver an output below the rated output if the feedback is not below the threshold.

10. The controller of claim 1 wherein the processor is further configured to generate an operator notification if the feedback is not below the threshold.

11. The controller of claim 1 further comprising a map having a plurality of thresholds and corresponding outputs.

12. A method of operating a welding-type power source comprising the steps of:
    determining at least one operating condition of a welding-type power source;
    comparing the at least one operating condition to a desired operating range;
    delivering an output of the welding-type power source; and
    wherein the output is above a rated output if the at least one operating condition is within the desired operating range and the output is below the rated output if the at least one operating condition is outside the desired operating range.

13. The method of claim 12 further comprising the step of notifying an operator if the at least one operating condition is not within the desired operating range.

14. The method of claim 12 further comprising the step of reducing the output of the welding-type power source if the at least one operating condition is outside the desired operating range.

15. The method of claim 12 wherein the step of determining further includes determining at least one of a temperature of the welding-type power source, an oil temperature of the welding-type power source, a rectifier temperature of the welding-type power source, an inverter temperature of the welding-type power source, an ambient temperature surrounding the welding-type power source, a duty cycle of the welding-type power source, and an RPM of the welding-type power source.

16. The method of claim 12 wherein the steps of determining, comparing, and delivering are performed automatically.

17. A welding-type power source comprising:
    an engine;
    a generator configured to be driven by the engine;
    a controller configured to monitor operating conditions of the welding-type power source and control the engine and the generator to deliver an output above a rated output if the operating conditions are under a rated maximum parameter threshold; and
    wherein the controller is further configured to hierarchically rank the operational feedback to determine if the operating conditions under a rated maximum parameter threshold.

18. The welding-type power source of claim 17 wherein the controller is configured to control the engine and the generator to operate to deliver an output within the rated output if the operating conditions are not under a rated maximum parameter threshold.

19. The welding-type power source of claim 17 wherein the controller is configured to notify a user of the welding-type power source if the operating conditions are not under a rated maximum parameter threshold.

20. The welding-type power source of claim 17 wherein the welding-type power source is configured to be incorporated into a portable welding-type apparatus.

21. The welding-type power source of claim 17 wherein the welding-type power source is configured to deliver welding-type power for at least one of a metal inert gas (MIG) welding-type process, tungsten inert gas (TIG) welding-type process, a shielded metal arc welding (SMAW) welding-type process, an induction heating process, and a plasma-cutting process.

22. A welding-type device comprising:
    an engine-driven generator;
    a controller configured to monitor at least one parameter of the welding-type device and control the generator to deliver a power output above a rated power output if the at least one parameter is under a rated maximum parameter threshold; and
    wherein the at least one parameter includes at least one of an oil temperature of the welding-type power source, a rectifier temperature of the welding-type power source, an inverter temperature of the welding-type power source, an ambient temperature surrounding the welding-type power source, a duty cycle of the welding-type power source, and an RPM of the welding-type power source.

23. A welding-type power source controller comprising:
    a processor configured to control a welding-type power source to produce a variable maximum output that can exceed a rated maximum output;
    an input configured to receive feedback indicative of operating conditions of a welding-type power source, wherein the feedback includes at least one of welding-type power source temperature feedback, engine oil temperature feedback, output rectifier temperature feedback, inverter temperature feedback, ambient temperature feedback, duty cycle feedback, and engine RPM feedback; and
    wherein the processor is configured to hierarchically rank the feedback to determine the current operating conditions of the welding-type power source.

* * * * *

UNITED STATES PATENT AND TRADEMARK OFFICE
CERTIFICATE OF CORRECTION

PATENT NO. : 7,297,899 B2  Page 1 of 1
APPLICATION NO. : 10/709837
DATED : November 20, 2007
INVENTOR(S) : Daniel C. Fosbinder It is certified that error appears in the above-identified patent and that said Letters Patent is hereby corrected as shown below:

Col. 7, line 7 (Claim 4), delete "cuffent" and substitute therefore -- current --;

Col. 7, line 16 (Claim 6), delete "cuffent" and substitute therefore -- current --;

Col. 7, line 64 (Claim 15), delete "suffounding" and substitute therefore -- surrounding --.

Signed and Sealed this

Thirteenth Day of May, 2008

JON W. DUDAS
*Director of the United States Patent and Trademark Office*